Dec. 1, 1942.   J. P. BADENHAUSEN   2,303,811
CHEMICAL RECOVERY SYSTEM FOR PULP MILLS
Filed Jan. 9, 1940   2 Sheets-Sheet 2

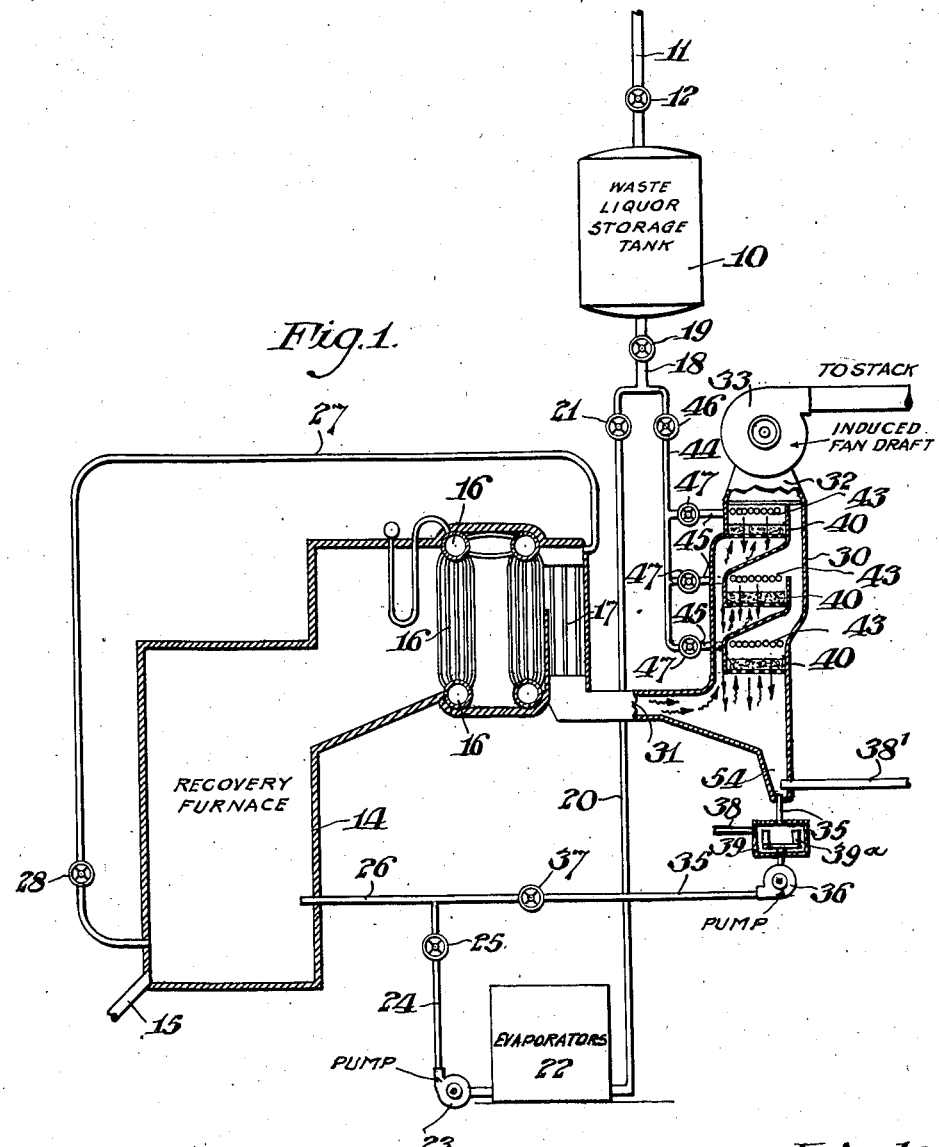

Inventor:
John Phillips Badenhausen
By Z. T. Wolbensmith 2nd
Attorney.

Patented Dec. 1, 1942

2,303,811

UNITED STATES PATENT OFFICE 2,303,811

CHEMICAL RECOVERY SYSTEM FOR PULP MILLS

John Phillips Badenhausen, Philadelphia, Pa., assignor of one-half to Day and Zimmermann, Incorporated, Philadelphia, Pa., a corporation of Maryland Application January 9, 1940, Serial No. 313,143

1 Claim. (Cl. 23—262)

This invention relates to the chemical recovery systems for pulp mills and more particularly to improved apparatus and methods for use in the recovery of chemicals in pulp mills.

With practically all the furnaces now employed for the recovery of chemicals from the residual liquid obtained from the digesters portions of the chemicals available in the waste liquid are carried over beyond the furnace, and in many instances the chemicals have not been recovered. Various expedients have been employed in an effort to recover chemicals carried over beyond the recovery furnaces. These have included washers of various kinds, Cottrell precipitators and other apparatus, but none of the devices heretofore employed have proven wholly satisfactory.

The exhaust gases from the recovery furnaces used in this field contain, in addition to the chemicals which it is desired to recover, insoluble chemicals which, when returned to the evaporators for concentrating the waste liquor prior to its introduction into the furnace, have a harmful effect upon the evaporator system. These insoluble chemicals clog up the passages and tubes in the evaporators and necessitate frequent cleaning and repairing of the evaporators.

In addition to the foregoing the provisions for introducing the salt cake for make up have not been wholly satisfactory in the chemical recovery systems heretofore employed and have involved certain difficulties which are overcome by the present invention.

It is an object of the present invention, therefore, to provide improved apparatus and methods for the recovery of chemicals in pulp mills and particularly from the exhaust gases passing from the recovery furnace.

It is a further object of the present invention to provide an improved method of handling insoluble chemicals which are present in the exhaust gases passing from the recovery furnace.

It is a further object of the present invention to provide an improved mode of supplying salt cake for introduction into the recovery furnace.

It is a further object of the present invention to provide for better utilization of the heat in the exhaust gases passing from the recovery furnace.

Other objects of the invention will be apparent from the annexed specification and claim.

The nature and characteristic features of the invention will be more readily understood from the following description, taken in connection with the accompanying drawings forming part hereof, in which:

Figure 1 is a diagrammatic view illustrating one form of apparatus embodying the main features of the present invention;

Figure 3:
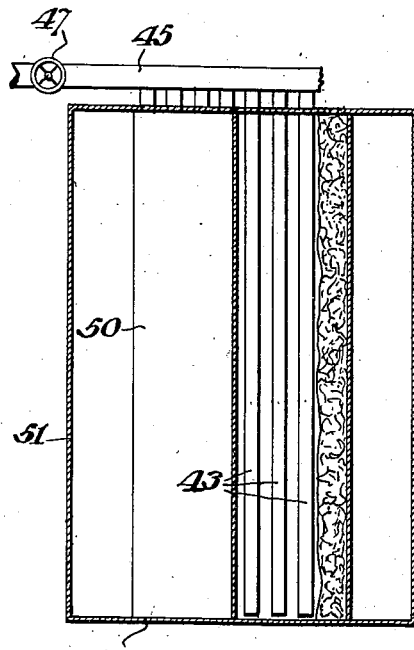
Fig. 3 is a horizontal sectional view taken approximately on the line 3—3 of Fig. 2.

It will, of course, be understood that the description and drawings herein contained are illustrative merely, and that various modifications and changes may be made in the structure and methods disclosed without departing from the spirit of the invention.

In the manufacture of pulp, particularly by the sulphate process, large quantities of waste liquor are obtained from the pulp digesters. With the sulphate and similar processes this liquor contains relatively large quantities of water and relatively small quantities of solids. The waste liquor contains chemicals and combustible organic and inorganic matter derived from the pulp making processes. In order to recover as large a part as possible of the chemicals, in a form suitable for treatment and reuse in the pulp making processes, the waste liquor has heretofore been concentrated. The concentration has been carried to an extent such that the combustible constituents of the concentrated liquor are capable of supporting combustion in a recovery furnace. The concentrated waste liquor has been introduced into a recovery furnace and the combustible constituents burned. The chemicals are separated by the combustion and withdrawn in molten or other desired form.

The heat from the combustion has been utilized for steam generation to supply some or all of the steam needed in the pulp mill. The waste or exhaust gases from the furnace have then been discharged to the stack. In some instances provision has been made between the recovery furnace and the stack for using a portion of the heat in the exhaust gases for preheating the air supplied to the furnace for combustion. Some treatment of the furnace gases with a view to recovering chemicals therefrom has also heretofore been undertaken, but the modes of treatment heretofore attempted have been expensive and not productive of results justifying the treatment.

For purposes of explanation of the apparatus and methods of the present invention the apparatus has been illustrated diagrammatically in Fig. 1. A waste liquor storage tank is shown at 10, this being connected by a suitable pipe 11 with a control valve 12 therein to the digesters (not shown) from which the weak waste liquid is supplied. In some installations, where the flow of waste liquor is substantially uniform, the storage tank 10 may be eliminated, although it is desirable that a reasonably uniform flow of waste liquor be available for the system of the present invention.

A recovery furnace is illustrated at 14 and may be of any suitable type for effecting the combustion of the combustible constituents of concentrated waste liquid and the recovery of chemicals in molten form at the spouts 15 or in other desired form. The recovery furnace 14 preferably has a steam generator built integral therewith for generating steam for use in the pulp mill, the drums and tubes forming part of the steam generator being indicated at 16. The recovery furnace 14 may also, if desired, be provided with an air heater 17 for the preheating of the air supplied to the recovery furnace 14 for supporting combustion therein, the exhaust combustion gases from the furnace being brought into contact with the air heater tubes for the transfer of heat from the gases to the air.

The waste liquor storage tank 10 may be connected through a pipe 18 having a control valve 19 therein, and a pipe 20 having a control valve 21 therein to evaporators, indicated at 22, for the purpose of concentrating the weak waste liquor by the removal of a substantial portion of the water content thereof in the manner well known in this field.

The evaporators 22 are preferably connected to a pump 23 and a pipe 24, having a control valve 25 therein, to a liquor supply pipe 26 for the delivery of the concentrated waste liquor. The liquor supply pipe 26 is connected to the recovery furnace 14 for the introduction into the furnace of the concentrated waste liquor for the combustion therein of the combustible constituents, and the recovery therefrom, preferably in molten form, of the greater portion of the recoverable chemicals therein.

The preheated air from the air heater 17 is delivered through the duct 27, having the control damper 28 therein, to the recovery furnace 14 for supporting combustion.

In accordance with the present invention a tower 30 is provided which is preferably connected by a duct 31 to the hot gas outlet of the air heater 17.

The gas outlet 32 of the tower 30 is preferably connected to the stack (not shown) and an induced draft fan 33 for assisting in the withdrawal of the exhaust gases from the recovery furnace 14, and the passage through the air heater 17 and the tower 30 is preferably provided. The fan 33 may be disposed between the air heater 17 and the tower 30, but is preferably located between the tower 30 and the stack (not shown) as illustrated.

The lower portion of the tower 30 is connected by a pipe 35 to a tank 39 which has an agitator 39ᵃ therein for agitating the contents. A salt cake supply pipe 38 may be employed for introducing salt cake. The tank 39 is connected to a pump 36 for the delivery of concentrated residual materials to the pipe 26. The pipe 35 has a control valve 37 therein and is connected to the delivery pipe 26. The lower portion of the tower 30 also has a salt cake supply pipe 38' connected thereto so that salt cake, preferably in powdered form, may be added to the concentrate at the lower part of the tower 30 for make up.

Figure 2:
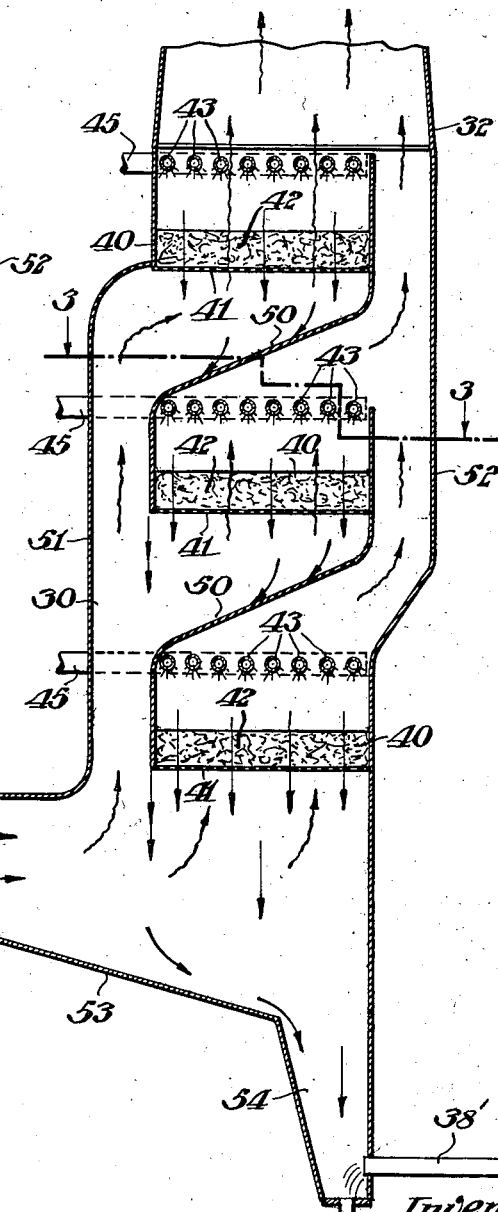
Fig. 2 is a vertical central sectional view taken through a sprinkler tower in accordance with the present invention.

The tower 30 is illustrated in more detail in Figs. 2 and 3 and includes provisions for bringing weak waste liquor into intimate contact with the exhaust gases from the recovery furnace 14. The purpose of the tower 30 is to effect a physical contact between the hot exhaust gases and the waste liquor, a reduction of the temperature of the exhaust gases and the transfer of heat and chemicals therefrom, an increase in temperature of the waste liquor by the transferred heat and the vaporization of water from the waste liquor, as hereinafter more fully referred to.

The tower 30 is preferably provided, for the purpose of bringing the exhaust furnace gases and the weak waste liquor into contact, with one or more contact compartments 40. A plurality of such compartments 40 is preferably employed and these compartments 40 may be disposed one above another, as illustrated in Fig. 2, for the purpose of reducing the horizontal space required for the tower. Each compartment 40 is open at the top, has a floor 41 of screening, perforated plates or the like, for passage of the exhaust furnace gases and waste liquid and is provided with suitable tower packings 42 of the type used in other types of towers. The packings 42 may consist of raschig rings, berl saddles, or any other similar packings which present a relatively large surface area, which have a relatively large ratio of free space for a given volume, so that the gas and liquid may be brought into contact without excessive restriction of flow, which are made of material resistant to the chemical action of the gases and the constituents of the waste liquor and which are not excessive in weight.

Above each packed compartment 40 a plurality of sprays are provided for the delivery to the respective compartments 40 of weak liquor. These sprays may be of any desired type, but in the form shown consist of spaced pipes 43 having perforations.

The spray pipes 43 are preferably supplied with weak liquor through the pipe 44 and branch pipes 45, the pipe 44 having a control valve 46 therein and the branch pipes 45 having control valves 47 therein.

A baffle plate 50 is preferably provided between each pair of adjoining compartments 40 and the end portions of the baffle plates 50 are spaced from the exterior walls 51 and 52 so that the gas is separated into a plurality of streams for delivery to the respective compartments 40 and for discharge therefrom.

The baffle plates 50 and the lower portion 53 of the tower 30 are preferably inclined so that liquor delivered from the compartments 40 and falling on the upper faces thereof is delivered downwardly for collection in a collecting space 54 below the lowermost compartment 40. The lower faces of the baffle plates 50 serve to direct the gases which have passed through the contact compartments 40.

The pipe 38 is connected to the collecting space 54 for the delivery thereto of the salt cake, preferably in powdered form for make up, and the collecting space 54 of the tower 30 is connected by the pipe 35 to the waste liquor supply line 26 for the recovery furnace 14.

The operation of the system will now be pointed out. The weak waste liquor is delivered from the digesters (not shown) to the weak liquor storage tank 10 and from the tank 10 passes through the pipe 18, the flow being divided so that the major portion of the weak waste liquor passes through the pipe 20 to the evaporators 22 where it is concentrated to the desired extent and preferably to a condition so that the solids content is in excess of 50%. From the evaporators 22 the waste liquor so concentrated is delivered by the pump 23 through the pipe 24 to the feed pipe 26 and into the recovery furnace 14 for combustion of the combustible constituents, vaporization of the remaining water content, and separation of chemicals for collection and recovery.

As a result of the heat released by the combustion in the recovery furnace 14 steam is generated by the steam generator 16. The hot gases from the combustion give up a further portion of their heat in the air heater 17 for preheating the air supplied through the air duct 27 to the recovery furnace 14. The chemicals may be withdrawn through the smelt spout 15 if in molten form. The hot gases then pass through the duct 31 to the tower 30.

The gas passing from the air heater 17 may be of a temperature of approximately 400° F. When the gas is at a temperature of this order it will contain chemicals carried over from the recovery furnace 14 in finely divided solid form and chemicals in a sublimed condition and the manner in which these chemicals are collected will be hereinafter pointed out.

The other portion of the weak waste liquor which is not passed through the evaporators 22 is delivered by the pipe 44 to the branch pipes 45 and then to the spray pipes 43. The weak waste liquor is discharged through the openings in the spray pipes 43 and falls downwardly to and into the contact compartments 40. The liquor in its downward passage to the contact compartments 40 comes into contact with an ascending stream of gases and gives up a portion of its moisture content. The liquor is thus delivered to the contact compartments 40 where the tower packings 42 cause the liquor to be brought into intimate contact with the hot exhaust gases passing upwardly through the contact compartments 40.

By the contact of the exhaust gases from the recovery furnace 14 with the waste liquor in and above the contact compartments 40 the recoverable chemicals in the gases in solid form will be collected by the liquid particles and retained and prevented from passing to the stack. The chemicals carried by the furnace gases in the sublimed condition will also be brought by a reduction of the gas temperature to a temperature such that they solidify and in this form are entrained and carried down by the waste liquor. At the same time the heat of the waste furnace gases is utilized for evaporating a large proportion of the water contained in the waste liquid which will be thickened by the evaporation of the water therefrom until the solids content of the waste liquor is brought within the range of approximately 40% to 60% solids.

The concentrated waste liquor obtained in the tower 30, together with the collected carry over chemicals, is directed downwardly by the baffles 50 and by the lower inclined floor 53 of the tower 30 so that the concentrated waste liquor is delivered to the collecting space 54 at the bottom of the tower 30. The concentrate from the collecting space 54 is then delivered to the tank 39 and by the pump 36 through the pipe 35 to the delivery pipe 26 and into the furnace 14.

It is advantageous to introduce the salt cake for make up into the concentrate and this may be done through the pipe 38 or the pipe 38'.

It will be noted that not all of the waste liquor from the pulp digesters is passed through the tower 30, but preferably only sufficient weak liquor is supplied so as to catch and entrain the chemicals carried over from the recovery furnace, remove the insoluble chemicals from the furnace gases and to carry the salt cake for make up.

Since it is not necessary to have high gas exit temperatures for use in the tower 30 the use of an air heater 17 is permitted with consequent increase in steam production from the steam generator 16 which is used with the recovery furnace 14. The increase in power and consumption is relatively small because of the character of the tower 30 and of the tower packings 42 utilized in the contact compartments 40.

I claim:

Apparatus for treating waste liquor from industrial processes which includes a chemical recovery furnace in which the combustible constituents of the waste liquor are burned, and means constructed and arranged to bring waste liquor and the exhaust combustion gases from the furnace into contact for the collecting of chemicals carried over from said furnace and for concentrating the waste liquor, said means including a plurality of contact compartments disposed one above another in parallel to the flow of gas with an exhaust gas inlet at the bottom and a gas outlet at the top, each of said compartments being provided with packings having a large surface area and a large ratio of free space, connections for delivering said exhaust gases to each of said compartments for upward movement therethrough, spray devices for spraying waste liquor downwardly into each of said compartments and for contact with the exhaust gases, and said compartments being separated by inclined intermediate partition walls, the portions of each partition wall facing towards a compartment thereabove collecting and delivering downwardly concentrated residual material from that compartment and the portions of each partition wall facing toward a compartment therebelow directing the gases passing from that compartment.

JOHN PHILLIPS BADENHAUSEN.